United States Patent

Hoare et al.

(10) Patent No.: US 10,302,760 B2
(45) Date of Patent: May 28, 2019

(54) VEHICLE WATER DETECTION SYSTEM

(71) Applicant: Jaguar Land Rover Limited, Coventry, Warwickshire (GB)

(72) Inventors: Edward Hoare, Malvern (GB); Thuy-Yung Tran, Rugby (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 365 days.

(21) Appl. No.: 15/118,459

(22) PCT Filed: Feb. 3, 2015

(86) PCT No.: PCT/EP2015/052153
§ 371 (c)(1),
(2) Date: Aug. 11, 2016

(87) PCT Pub. No.: WO2015/121109
PCT Pub. Date: Aug. 20, 2015

(65) Prior Publication Data
US 2017/0176592 A1 Jun. 22, 2017

(30) Foreign Application Priority Data

Feb. 12, 2014 (GB) .................................. 1402394.9

(51) Int. Cl.
*G01S 13/93* (2006.01)
*G01S 15/93* (2006.01)
(Continued)

(52) U.S. Cl.
CPC ..... *G01S 13/931* (2013.01); *B60W 30/18009* (2013.01); *B60W 40/06* (2013.01);
(Continued)

(58) Field of Classification Search
CPC .... B60W 40/06; B60W 50/082; G01S 13/862
(Continued)

(56) References Cited

U.S. PATENT DOCUMENTS

2012/0070071 A1   3/2012 Rankin et al.
2012/0262326 A1*  10/2012 Abrahamson ........... G01M 3/18
                                                    342/22
2013/0333483 A1*  12/2013 Horoshenkov ..... G01F 23/2962
                                                    73/861.25

FOREIGN PATENT DOCUMENTS

DE        3121684 A1    12/1982
DE    102012004198 A1    10/2012
WO      2013144252 A1    10/2013

OTHER PUBLICATIONS

International Search Report and Written Opinion for International Patent Application No. PCT/EP2015/052153, dated Apr. 7, 2015, 12 pages.

* cited by examiner

*Primary Examiner* — Peter M Bythrow
*Assistant Examiner* — Helena H Seraydaryan
(74) *Attorney, Agent, or Firm* — Miller Nash Graham & Dunn LLP (57) ABSTRACT

The invention relates to determining the presence of flowing water (B) in the vicinity of a vehicle. It relies on a pair of sensors (6a) emitting periodic signals, receiving reflected signals and comparing them to each other to determine the presence of flowing water in the area surrounding the vehicle. Another approach relies on a single sensor and analyses perturbations in the signal of said sensor. Preferably, the invention uses sensors already installed, namely parking sensors and a radar.

16 Claims, 4 Drawing Sheets

(51) Int. Cl.
  *G01S 13/86*   (2006.01)
  *B60W 50/08*   (2012.01)
  *B60W 50/14*   (2012.01)
  *B60W 30/18*   (2012.01)
  *B60W 40/06*   (2012.01)
  *B60W 50/00*   (2006.01)

(52) U.S. Cl.
  CPC .......... *B60W 50/082* (2013.01); *B60W 50/14* (2013.01); *G01S 13/862* (2013.01); *G01S 15/931* (2013.01); *B60W 2050/0095* (2013.01); *B60W 2050/146* (2013.01); *B60W 2420/52* (2013.01); *B60W 2420/54* (2013.01); *B60W 2550/12* (2013.01); *G01S 2013/9321* (2013.01); *G01S 2013/9357* (2013.01); *G01S 2013/9364* (2013.01); *G01S 2013/9389* (2013.01); *G01S 2015/932* (2013.01)

(58) Field of Classification Search
  USPC .......................................................... 342/70
  See application file for complete search history.

VEHICLE WATER DETECTION SYSTEM

CROSS-REFERENCE TO RELATED APPLICATIONS

This application is a 371 of International Application No. PCT/EP2015/052153, filed 3 Feb. 2015, which claims priority to GB Patent Application 1402394.9, filed 12 Feb. 2014, the contents of which are incorporated by reference herein in their entirety.

FIELD OF THE INVENTION

This invention relates to a vehicle water detection system. In particular, but not exclusively, the invention relates to a system for enabling a vehicle to detect flowing water in its vicinity. Aspects of the invention relate to a method, to a system, to a computer program product, to a computer readable medium, to a processor, or to a vehicle.

BACKGROUND

Some modern vehicles, particularly "off-road" vehicles, are adapted to enable the vehicle to wade through flowing water up to a certain depth. Such vehicles are able to safely traverse streams and shallow rivers, without risk of damage to components of the vehicle.

This is of clear benefit in the context of off-road driving, as there is no need for a driver to make route adjustments in order to avoid water. Even in the context of on-road driving, during times of severe flooding a road may have water flowing across it, for example if a nearby river is overflowing. Vehicles adapted for wading through flowing water are more able to cope with this scenario.

To help a driver maintain control of a vehicle while it passes through water, a wading mode may be implemented in which various settings are optimised for wading. For example, steering systems, traction control systems and braking systems may be adjusted to provide a response that is tailored for the purpose of wading.

At present, some known systems enable the vehicle to automatically detect when it is in water, and to activate a wading mode. This provides a convenient arrangement for the driver, who does not need to manually select the wading mode prior to entering the water.

In one example which is described in the Applicant's earlier application WO 2012/080439 A1, a vehicle is provided with acoustic sensors which generate an alert when immersed in water. Generation of the alert is based on the principle that a diaphragm of the sensor settles more quickly when immersed in water than in air. The sensors are positioned at suitable points on the exterior of the vehicle, for example on the underside of a body of the vehicle, at a pre-determined height above the ground. Accordingly, when the sensors generate an alert indicating that they are immersed in water, the water level around the vehicle can be determined by virtue of the known elevation of the sensor. In order to prevent nuisance triggering of the alert, the sensors are placed at a suitable height to ensure that, for example, they do not become immersed as the vehicle drives through puddles.

While this arrangement provides automatic detection of a wading event and automatic activation of a wading mode, this only occurs once the vehicle is immersed in the water to a significant depth. Therefore, there is still potential for reduced control of the vehicle during a period defined between entry into the water and automatic activation of the wading mode.

In a similar arrangement which is described in another of the Applicant's earlier applications, WO 2012/123555 A1, downwardly-directed acoustic sensors are positioned at a known elevation above ground-level and are arranged to emit an ultrasonic signal, and then to detect a reflected signal returning from a surface below. The time-of-flight (TOF) of the signal is determined, from which the distance from the sensor to the surface can be determined using conventional algorithms. If the vehicle is in water, the surface of the water is closer to the acoustic sensor than the surface of the road. As a consequence, when the signal is reflected from the surface of the water, the TOF is shorter than expected. The difference between the expected TOF and the indicated TOF can be used to determine the distance between the sensor and the surface of the water, and therefore the depth of water. This means that the arrangement can determine that the vehicle is in water prior to the acoustic sensors becoming immersed.

The arrangement of WO 2012/123555 A1 can be used as an alternative or in combination with the arrangement of WO 2012/080439 A1 in which sensors generate an alert when immersed, as measurement of the TOF enables earlier detection of a wading situation and thus earlier activation of the wading mode. By improving the responsiveness of the system in this way, the period between entry of the vehicle into water and activation of the wading mode is reduced. However, the immersion sensors as described in WO 2012/080439 may be able to give a more positive determination of a wading event. These systems benefit the driver, as the vehicle can be configured in the correct driving mode, thus providing a tailored response profile, for a higher proportion of driving time, i.e. including when the vehicle is wading.

While both of the above described arrangements can automatically detect entry of a vehicle into water, neither has the capability to determine the water conditions. Different water conditions present different challenges for the vehicle, and so there is potential to tailor the wading mode response accordingly. In addition, all vehicles have limitations with regard to wading, and therefore it would be desirable to obtain sufficient information regarding water conditions ahead of a vehicle to enable a determination of whether it is advisable to enter the water. The known systems described above have no provision for taking such measurements for assisting driver judgement.

Against this background, it would be desirable to provide an improved water detection system for a vehicle, which overcomes or at least substantially alleviates the disadvantages known in the prior art.

SUMMARY OF THE INVENTION

According to an aspect of the invention there is provided a method for determining the presence of flowing water in the vicinity of a vehicle, the method comprising emitting a pair of periodic signals into an area surrounding the vehicle, and receiving a pair of reflected periodic signals each of which is a reflection of at least part of a respective one of the emitted pair of periodic signals. The method further comprises comparing the reflected pair of periodic signals to identify differences between them, and analysing the differences to determine the presence of flowing water in the area surrounding the vehicle.

According to another aspect of the invention an alternative method for determining the presence of flowing water in the vicinity of a vehicle is provided, comprising emitting a periodic signal into an area surrounding the vehicle, and receiving a signal that is a reflection of at least part of the emitted periodic signal. The method further comprises identifying perturbations in the reflected periodic signal, and analysing the perturbations to determine the presence of flowing water in the area surrounding the vehicle.

In the known systems described above only the presence of water near or around the vehicle can be detected. Such systems are not able to make a judgement as to whether the water is still or flowing. While many vehicles are adapted for wading in standing water, it is generally not desirable for a vehicle to wade in flowing water. By enabling detection of flowing water in the vehicle's vicinity, this embodiment of the invention allows the vehicle to trigger an alert which can be presented to a driver of the vehicle to warn them that the water is flowing and therefore it may not be advisable to enter.

The periodic signals are advantageously composed of waveforms, the characteristics of which may be known and/or predetermined. Accordingly, the characteristics of returning waveforms can be analysed in order to identify perturbations, or compared with one another to identify differences. Since vehicles are typically equipped with sensors capable of emitting and receiving periodic signals, for example acoustic or electromagnetic signals, such sensors can beneficially be adapted for use in the method of this aspect of the invention with minimal modification.

In the methods of either of the above aspects, the or each emitted periodic signal may be acoustic. In these embodiments, the or each emitted periodic signal may have a frequency in the range 40 kHz to 55 kHz. Beneficially, the or each emitted periodic signal may be emitted by an acoustic sensor associated with a vehicle-mounted assisted parking system, thereby making use of equipment already found on conventional vehicles.

In the methods of either of the above aspects, the or each emitted periodic signal may be electromagnetic, in which case the or each emitted periodic signal may be emitted from a radar sensor associated with a vehicle-mounted adaptive cruise control system. Advantageously, this makes use of equipment already carried by the vehicle, and so the additional extra equipment required to implement the above methods is minimal.

For the aspect involving identifying perturbations in the reflected signal, the method may comprise determining an expected reflected periodic signal, and comparing the reflected periodic signal with the expected reflected periodic signal to identify the perturbations. In these embodiments, perturbations falling below a pre-determined threshold may not be analysed in order to prevent false determinations of the presence of water. For these embodiments, the expected reflected periodic signal may be calculated based on the speed of the vehicle.

Perturbations may manifest in the reflected periodic signal as a frequency difference compared with the expected reflected waveform. This arises as a result of the Doppler effect when the emitted signal interacts with a moving surface in the vicinity of the vehicle.

For the aspect in which differences between a pair of signals are identified, since each emitted signal propagates into a different area, the characteristics or their respective broadcast areas may be different; for example if one broadcast area contains moving water and another does not. In this situation, the reflected signals will be different as a result of the different interactions entailed. The differences between the reflected signals may comprise differing frequency spectra, differing average signal strengths, or a combination of the two.

In any of the above methods, a water flow direction and/or a water flow rate may be determined through analysis of the perturbations or differences identified.

In the methods of either of the above aspects, a vehicle wading mode may be activated upon detection of moving water.

For the methods of either of the above aspects, a water detection mode may be activated automatically according to driving parameters, or it may be user-activated through a human-machine interface of the vehicle.

The methods of either of the above aspects may comprise triggering an alert upon detection of moving water, which may be presented to a driver of the vehicle in order to warn them that it is not advisable to proceed. The method may take into account the flow rate and depth of the water when determining whether to generate an alert.

According to another aspect of the invention, there is provided a system for determining the presence of flowing water in the vicinity of a vehicle, the system comprising transmitter means arranged to emit a pair of periodic signals into an area surrounding the vehicle, and sensing means arranged to receive a pair of reflected periodic signals each of which is a reflection of at least part of a respective one of the emitted pair of periodic signals. The system further comprises processing means arranged to compare the reflected periodic signals to identify differences between them, and to analyse the differences to determine the presence of flowing water in the area surrounding the vehicle.

According to a further aspect of the invention, there is provided a system for determining the presence of flowing water in the vicinity of a vehicle, the system comprising transmitter means arranged to emit a periodic signal into an area surrounding the vehicle, and sensing means arranged to receive a periodic signal that is a reflection of at least part of the emitted periodic signal. The system further comprises and processing means arranged to identify perturbations in the reflected periodic signal and to analyse the perturbations to determine the presence of flowing water in the area surrounding the vehicle.

In the systems of either of the above aspects, the or each transmitter means may be an acoustic transmitter. In these embodiments, the or each acoustic transmitter may be associated with a vehicle-mounted assisted parking system.

In the systems of either of the above aspects, the periodic signal may be electromagnetic. In these embodiments, suitably the or each transmitter means may be a radar sensor associated with a vehicle-mounted adaptive cruise control system.

In the systems of either of the above aspects, the or each sensing means and the or each transmitter means may be integrated.

For the aspect in which a system is provided that identifies perturbations in a reflected signal, the processing means may be arranged to determine an expected reflected periodic signal, and to compare the reflected periodic signal with the expected reflected periodic signal to identify the perturbations. In these embodiments, the processing means may be arranged only to analyse perturbations exceeding a pre-determined threshold. Furthermore, the processing means may be arranged to calculate the expected reflected periodic signal based on the speed of the vehicle.

In the systems of either of the above aspects, the system may be arranged to trigger an alert on detection of moving water.

According to another aspect of the invention, there is provided a computer program product executable on a processor so as to implement the method of either of the above aspects.

According to a further aspect of the invention, there is provided a computer readable medium loaded with the computer program product of the above aspect.

According to yet another aspect of the invention, there is provided a processor arranged to implement the method of either of the above aspects, or the computer program product described above.

The inventive concept also embraces in further aspects a vehicle arranged to implement the methods, the water detection systems, or the processor described above.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

Embodiments of the present invention will now be described, by way of example only, with reference to the accompanying drawings, in which:—

DETAILED DESCRIPTION

Figure 1:
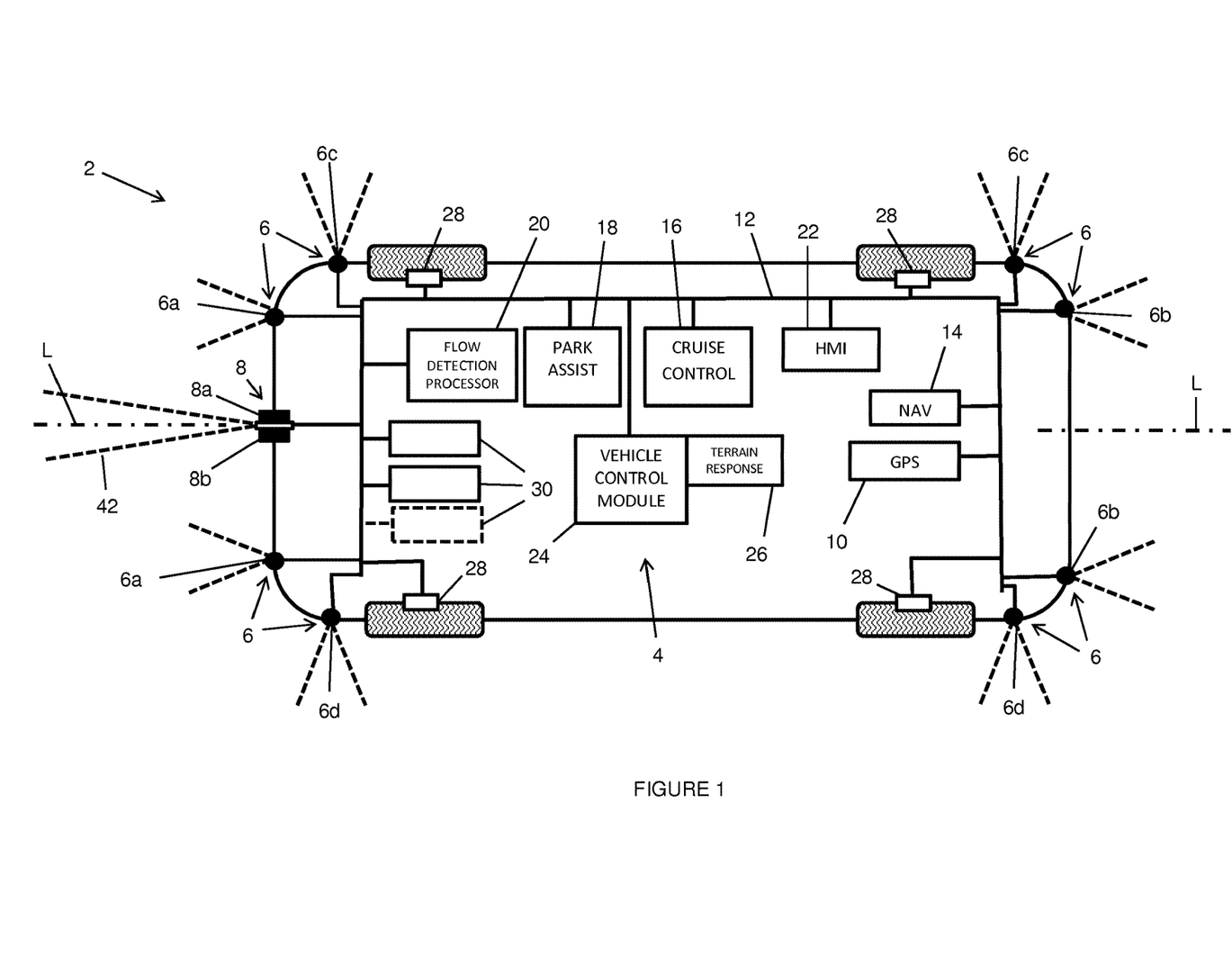
FIG. 1 is a schematic view of a vehicle system.

FIG. 1 shows in schematic form a vehicle 2 having a plurality of conventional vehicle systems. It will be appreciated that FIG. 1 is simplified for the purposes of this description and so is not intended to represent a complete electrical system of a vehicle 2. However, suitable components and functional modules are shown in order to provide an understanding of the inventive concept.

In overview, the vehicle 2 comprises a plurality of acoustic sensors 6, a forward-looking radar sensor 8, and a GNSS (global navigation satellite system) receiver 10, all of which interface with a vehicle local area network (LAN) 12. The system 4 also includes a navigation control module 14, an adaptive cruise control module 16, a park assist module 18, a flow detection processor 20, a HMI module (human-machine interface) 22 and a vehicle control module 24 all of the aforesaid modules being interfaced to the LAN 12 so as to be able to communicate bi-directionally with various other vehicle sub-systems in accordance with a suitable communications protocol such as the CAN (controller area network) protocol which is well known in the art.

Typically, the human machine interface module 22 (HMI) incorporates a display screen and an interface device such as a rotary selection dial, four-way directional selection buttons or a touchscreen interface, although other input means may also be used, for example voice activation. The HMI 22 is used to display alerts to the vehicle user regarding the appropriate vehicle set-up, and in response to which the user can adjust various vehicle settings, as appropriate. For example, the HMI module 22 may be used by the park assist module 18 to display information captured from the rear view of the vehicle 2, or the navigation module 14 may display map and route information via the HMI module 22.

By way of further example, a vehicle user may interface with the HMI module 22 to access in-car entertainment systems or to access functionality provided by the vehicle control module 24. In some vehicles 2 the vehicle control module 24 is configured to allow adjustments to be made to the ride characteristics of the vehicle 2. For example, in the context of a vehicle terrain response function 26 associated with the vehicle control module 24, sensor data from vehicle-mounted sensors 28 (wheel speed sensors, tyre pressure sensors, brake force sensors, suspension articulation sensors, pitch sensors, yaw sensors and the like) relating to the terrain over which the vehicle 2 is travelling are received by the vehicle control module 24. The vehicle control module 24 is operable to process the data and transmit control commands to one or more further subsystems 30 of the vehicle 2 (such as a suspension system, traction control system, engine torque vectoring system, stability control system or ride height adjustment system) so as to allow adjustment of the vehicle setup accordingly. The vehicle setup may be initiated by the user via the HMI module 22 or it may be controlled automatically by the vehicle control module 24.

Although shown as a single control module for simplicity, it will be appreciated that the functions of the vehicle control module 24 may be performed by a plurality of electronic control units/modules (ECUs) each performing a specific function (e.g. Terrain Response function) and communicating with one another via the CAN protocol.

As has been mentioned in the above overview, the vehicle 2 includes adaptive cruise control functionality provided by the adaptive cruise control module 16, and parking assistance functionality provided by the park assist module 18. Details of both functions will now be described by way of example.

Adaptive Cruise Control Function

Adaptive cruise control (ACC) functions for vehicles 2 are known, and are operable to adjust the vehicle speed to maintain a safe distance from another vehicle in the road ahead. Commonly, radar sensors are used to send and receive radar signals to generate data concerning traffic ahead of the vehicle 2 for processing by a suitable processing system. It should be noted that non-radar based systems are also in use, for example using video camera technology, lasers or acoustic-based sensing systems. Since adaptive cruise control functionality is generally known in the art, only a brief explanation will be described here.

In the vehicle 2 described with reference to FIG. 1, the vehicle-mounted radar sensor 8 associated with the adaptive cruise control (ACC) module 16 is mounted in the centre of the front of the vehicle 2 so that it has an unobstructed view of the road ahead. The radar sensor 8 has a radar transmitter 8a and a radar receiver 8b. Such radar sensors are known in the art, for example as part of the 'ACC Stop & Go' system provided by Bosch, and the multimode electronically scanning radar provided by Delphi Corporation.

The radar sensor 8 may be mounted in any suitable position, such as in the grille of the vehicle 2 or, alternatively, mounted behind or integrated into a suitable trimpiece such as a bumper (fender), or fog lamp unit. Although the radar sensor 8 is described as being centrally mounted it is also acceptable for it to be mounted in an off-centre position.

At this point it should be appreciated that in principle any frequency of radar signal is applicable, although in the automotive industries the use of radar is currently licensed to the spectrum extending between 21.65 and 26.65 GHz and 76-81 GHz. A particularly suitable type of radar sensor may be a frequency-modulated continuous-wave (FMCW) radar sensor.

In the embodiment of FIG. 1, the radar transmitter 8a and radar receiver 8b are oriented in alignment with a longitudinal axis L of the vehicle 2. In this way, a field of view of the radar receiver 8b is substantially symmetrical about the axis L and the emission beam of the radar transmitter 8a irradiates a region ahead of the vehicle 2 that is also substantially symmetrical about the axis L. The irradiated region and the field of view are both shown here by a substantially conical region identified as reference '42'.

In order to detect a vehicle in the road ahead accurately and at suitable distances (which may be in excess of 100 meters away), it is preferred that the radar sensor 8 has a relatively narrow bandwidth in the region of 10 degrees cone angle, by way of example. One example of a suitable system is the multimode electronically scanning radar as provided by Delphi Corporation which implements a narrow-beam long-range (approx. 174 m) radar coverage in conjunction with a wide-beam mid-range radar coverage.

The ACC module 16 is configured to determine the range of objects (i.e. vehicles) ahead of the vehicle 2 by measuring a frequency difference between the signal transmitted by the radar transmitter 8a and the signal received by the radar receiver 8b. It is to be noted that alternative embodiments may be based on a time-of-flight analysis of the reflected radar signal to determine the range of objects.

The ACC module 16 is further configured to determine the velocity of the objects in the road ahead relative to the velocity of the vehicle 2 based on the difference between the frequency of the radar return signal and the frequency of the transmitted radar signal. Due to the Doppler effect, the frequency of the radar signal return will be different to the emitted signal. Therefore, the ACC module 16 is able to calculate the speed of the object ahead relative to the speed of the vehicle 2 in dependence on the frequency shift between the emitted and returned signals.

When the ACC module 16 is activated, which is usually on the demand of the user, it is operable to control the speed of the vehicle 2 so as to maintain a desired distance from another vehicle in the road ahead. The 'desired distance' is a distance that is considered to be a safe following distance between vehicles, and may be a pre-programmed parameter within a suitable memory unit of the ACC module 16. The desired distance parameter may be adjustable by the user of the vehicle 2 or, alternatively, manual adjustment may be limited (e.g. by a minimum separation distance) or prohibited in order to prevent possible abuse of the system. Typically, the desired distance is a function of the instantaneous vehicle speed so that, for example, the desired distance that is maintained between the vehicles increases as the vehicle speed increases.

In order to maintain the desired distance from the vehicle in front, ACC module 16 communicates with other vehicles systems of the vehicle 2 (throttle control, brake control etc.) and the necessary action is taken to maintain a constant distance to the vehicle in front.

Radar sensors 8 may be positioned at other locations on the vehicle 2 to collect data to be input to, for example, blind spot detection (BSD) systems, lane departure warning systems, or detection systems for detecting external static or portable speed measurement systems, such as those used for detecting vehicles exceeding speed limits.

In the embodiment in FIG. 1 a single radar sensor 8 is provided. However, it should be noted that more than one radar sensor 8 is possible. For example, a combination of long range radar sensors and short range radar sensors could be employed, the short range radar sensors being particularly adept at providing information in the flank regions of the vehicle 2, for use in blind spot protection systems, lane change warning systems and the like.

Park Assist Function

It is known to provide vehicles 2 with systems that aid the driver of the vehicle 2 to park in tight spaces, particularly during parallel parking manoeuvres. Relatively simple systems are based around providing an array of parking distance control (PDC) sensors on the rear edge of a vehicle 2, typically integrated within the bumper/fender. More recently, however, more sophisticated systems have been developed which provide the vehicle 2 with an all-round sensing capability and which are operable to identify a suitable space in which a vehicle 2 should be able to park, and to control the vehicle 2 automatically to park within the identified space. In the art, such systems may be referred to by a variety of terms such as 'parking assist systems', 'intelligent parking systems', and 'smart parking systems'.

With reference to FIG. 1, the vehicle 2 is provided with a parking assist function by the park assist module 18 that is provided with data regarding the vicinity of the vehicle 2 by the acoustic sensors 6.

The acoustic sensors 6 are ultrasonic transceivers that are positioned at respective locations around the periphery of the vehicle 2. In the embodiment shown, four ultrasonic sensors 6a are installed on the front edge of the vehicle 2 (for example integrated in the bumper), one either side of the radar sensor 8. Four ultrasonic sensors 6b are positioned on the rear edge of the vehicle 2 (e.g. integrated into the rear bumper), two ultrasonic sensors 6c are mounted at spaced apart locations on the right hand side of the vehicle 2 and two ultrasonic sensors 6d are mounted at spaced apart locations on the left hand side of the vehicle 2. All of the ultrasonic sensors 6 are linked to the LAN 12 and so are able to communicate with the park assist module 18.

The ultrasonic sensors 6a installed at the front of the vehicle 2 are oriented to direct an ultrasonic signal in a forwards direction. Likewise, the ultrasonic sensors 6b are arranged to direct respective signals rearwards of the vehicle 2 and the ultrasonic sensors installed in the sides of the vehicles 2 are arranged to emit respective signals perpendicularly away from the longitudinal axis L of the vehicle 2.

The ultrasonic transceivers 6 preferably operate at a frequency between 40 and 55 kHz, more specifically about 51 kHz. One such sensor that may be used in such a system is available from Knowles Acoustics Ltd, model number SPM0204UD5.

The park assist module 18 is operable to receive data from all of the ultrasonic sensors 6 over the LAN 12 and process the received data to build up an image of the obstacles surrounding the vehicle 2. In particular the side-mounted sensors are operable to determine the location of gaps in rows of parked cars, but also to determine the location of other obstructions such as kerbs which the park assist module 18 can use in order to position the vehicle 2 correctly in a parking space. The parking assist module 18 is operable to warn a vehicle user, either by visual or audible means, of the vehicle's proximity to an obstacle. In the case of an audible warning, a warning tone may sound at an increasing rate or volume as an obstacle becomes closer to the vehicle 2. The acoustic sensors 6 used for parking assistance systems are typically able to detect obstacles at short-range (0.25-2.5 meters) but at a wide angle from the direction in which the sensor is pointed.

It is to be noted that, in general, parking assist systems are known in the art, so a detailed explanation of such a system will not be provided here.

Water Flow Detection Function

The above described systems are regularly included in vehicles as standard options. Each system is generally only used for short periods during driving, for example during a parking manoeuvre. Therefore, the sensors and processors associated with each system are idle for long periods. Accordingly, there is an opportunity to use these sensors for other purposes during these periods.

One such use is now described, in which the standard components are used according to embodiments of the invention for the detection of flowing water in the vicinity of the vehicle 2. For this purpose, a flow detection processor 20 is provided to control incoming and outgoing signals associated with the standard components in order to identify the presence of water. The flow detection processor 20 operates under the control of the vehicle control module 24, such that availability of the components to serve their normal function is not compromised.

Figure 2:
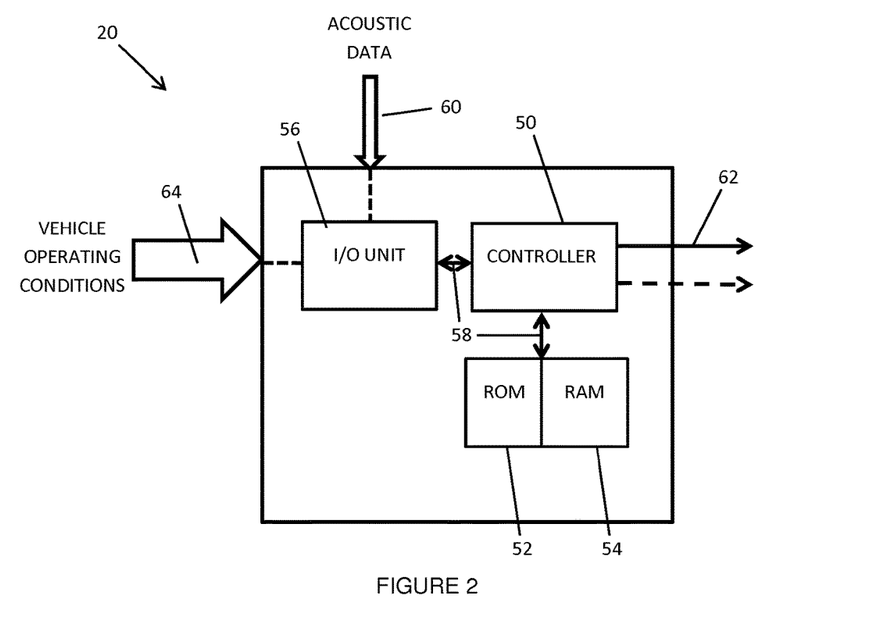
FIG. 2 is a schematic block diagram of a processing module of the vehicle system.

The flow detection processor 20 is shown in FIG. 1 in the context of the vehicle 2, and is illustrated schematically in more detail in FIG. 2 as incorporating a hardware configuration including at least a processing means or 'controller' 50 that is operable to perform control processing, a ROM (read only memory) 52 in which control programs for implementation by the controller 50 are stored, and a RAM (random access memory) 54 for the purposes of the temporary storage of data during the operation of the flow detection processor 20. The flow detection processor 20 also includes an I/O unit (input/output) 56 which acts as an interface between the LAN 12 and the controller 50. The ROM 52, RAM 54, controller 50 and I/O unit 56 are linked by suitable data buses 58.

The flow detection processor 20 is operable to determine the presence of flowing water in the vicinity of the vehicle 2 and, to this end, the flow detection processor 20 receives data from a plurality of vehicle sensor systems into the I/O unit 56. As illustrated, the flow detection processor 20 receives a data input 60 from one or more ultrasonic sensors 6 (ultrasonic data input).

Although the flow detection processor 20 is shown here as accepting one data input 60, it should be appreciated that the flow detection processor 20 may be configured to receive further input data from systems that are capable of providing measurements which may be used to identify the presence of flowing water. For example, the flow detection processor 20 may communicate with the radar sensor 8 in order to make use of the radar functionality of the vehicle 2 in the same way as the ultrasonic system.

It should be noted that none of the vehicle sensor systems that provide data to the flow detection processor 20 are intended primarily for that purpose. For example, the radar sensor 8 forms part of the adaptive cruise control function and the ultrasonic sensors 6 form part of the park assist function. The functionality of the flow detection processor 20 in this embodiment is therefore provided for the vehicle 2 with minimal further hardware costs since dedicated sensor suites are not required.

In overview, the flow detection processor 20 receives the acoustic data input 60, and processes the data in order to provide an output 62 that is indicative of the presence of flowing water in the vicinity of the vehicle 2. The output 62 may also contain further information regarding the water flow, such as flow rate and flow direction. In order to produce the output 62, the processor also takes account of current vehicle operating parameters, in particular vehicle speed, which are received by the I/O unit 56 as a vehicle operating condition input 64.

Figure 3:
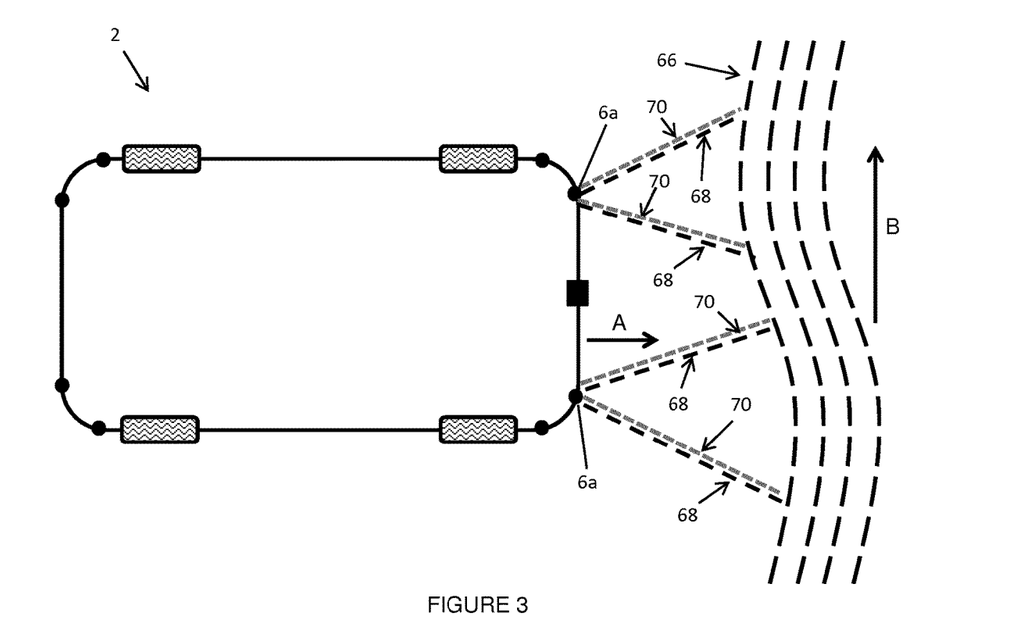
FIG. 3 is a schematic view of the vehicle of FIG. 1 as it approaches a cross-flow of water.

FIG. 3 illustrates, schematically, a vehicle 2 approaching a cross-flow 66 of water. This could represent, for example, a vehicle 2 approaching a stream when driving off-road, or a flow of water across a road, also known as a 'ford'. As shown, the vehicle 2 is travelling towards the water in a direction denoted by arrow A. The water flows in a direction perpendicular to the direction of travel of the vehicle 2, or 'cross-flows', as denoted by arrow B.

On entering a body of standing water, forward movement of a vehicle 2 is generally resisted due to the increased force required to displace water as compared with air. In the scenario depicted in FIG. 3, the cross-flow 66 presents an additional side force to the vehicle 2 which may cause it to deviate from its course. Accordingly, it is more difficult for a driver to maintain a steady course when driving through the cross-flow 66 as compared with wading through standing water. Because of this, wading is only recommended in standing water. There may exist circumstances whereby the driver may wish, or find it necessary, to traverse slowly moving water, however, traversing water beyond a certain speed is not recommended and may present a hazard.

Accordingly, this embodiment of the present invention provides means for determining the flow rate of the cross-flow 66, and an alert is triggered and presented to the driver through the HMI 22 if the flow rate exceeds a pre-determined threshold.

For a given flow rate, the impact of flowing water on the vehicle 2 becomes more significant as depth increases. For this reason, the depth of the flowing water ahead is also estimated, for example using techniques involving analysis of a longitudinal vehicle angle, the depth of water around the vehicle 2, and the flow rate, as disclosed in the Applicant's previous application published as WO 2013/120970. Accordingly, the alert threshold is variable, and is determined from a combination of the flow rate and the depth, for example by reference to a look-up table or an algorithm.

In this embodiment, the front-mounted acoustic sensors 6a which form part of the park-assist function are used to detect the cross-flow 66 of water. The sensors 6a are controlled by the flow detection processor 20 for this purpose. In other embodiments, the sensors are modified so as to direct a signal at an angle relative to the central axis L of the vehicle 2, such that the signal path lies ahead and to the side of the vehicle 2.

Since the vehicle 2 is unlikely to be driving through flowing water during a parking manoeuvre, there is no conflicting demand placed on the sensors 6a by using them to provide this extra functionality. Additionally, cross-flow detection may be deactivated in certain circumstances, thereby ensuring that the sensors are available for use in parking manoeuvres. For example, cross-flow detection may be deactivated in the event that it is determined that the vehicle is driving on tarmac.

In operation, as described previously, each sensor 6*a* emits an ultrasonic signal 68 into a region in front of the vehicle 2. The signal 68 diverges with displacement from the sensor 6*a* to define a cone angle. The signal 68 is reflected when it reaches the surface of the road or other terrain on which the vehicle 2 is driving. As all surfaces have a degree of roughness, the signal 68 scatters where it is incident on the surface, with surface bumps and defects causing the scattering. This results in a proportion of the signal 68 being reflected back towards the vehicle 2 as a reflected signal 70, which can be detected by the sensors 6*a* in the same way as when they are used for the park assist function.

Since the vehicle 2 is moving and the ground surface is stationary, the frequency of the reflected signal 70 is altered relative to the frequency of the emitted signal 68 as a result of the Doppler effect. The frequency of the reflected signal 70 is typically higher than that of the emitted signal 68, as the signal 68 effectively becomes compressed as the vehicle 2 moves forwards. The vehicle velocity is known, for example from a speedometer measurement or more preferably from a vehicle ground speed measurement obtained from, for example, a vehicle mounted radar sensor, an inertial sensor, or the GNSS receiver 10. Therefore, the expected frequency of the reflected signal 70 can be calculated.

It should be noted that the Doppler shift induced in the reflected signal 70 is a function of the speed of the vehicle 2 relative to the surface from which the signal 68 is reflected. In this situation, this means that the frequency shift is a function of the relative speed between the vehicle 2 and the scattering objects, i.e. in normal driving the bumps and defects in the road surface. Normally, these scattering objects are a part of the road surface, and are therefore stationary. Accordingly, the relative speed between the vehicle 2 and the reflecting surface is normally equal to the speed of the vehicle 2.

However, as the vehicle 2 approaches a cross-flow 66 of water, some of the emitted ultrasonic signal 68 scatters on ripples and waves on the surface of the water. As the water is moving, the speed of the vehicle 2 relative to the scattering objects, namely the ripples and waves on the water surface, is not equal to the vehicle speed, as it will comprise a component that is a result of the water movement. Therefore, the resulting change in frequency in the reflected signal 70 is slightly different to when the reflecting surface is stationary, and so the frequency of the reflected signal 70 that is detected differs from the expected frequency.

A perturbation in the reflected signal 70, namely a reflected signal 70 having a frequency differing from the calculated expected frequency, can therefore be used to determine the presence of a cross-flow 66 of water in the region into which the ultrasonic signal 68 is broadcast. It should be appreciated that although the example shown in FIG. 3 shows water flowing perpendicular to the direction of travel of the vehicle 2, the cross-flow 66 could be skewed at any angle relative to the direction of travel. Any movement in a surface having scattering objects which give rise to a reflected signal 70 will result in a perturbation in the reflected signal 70 as a result of the Doppler effect. As noted above, it is the relative movement of the emitting sensor 6*a* to the scattering objects which causes a Doppler shift in the returning signal.

The resulting Doppler signal may be analysed using several suitable spectral analysis techniques including a Fourier Transform, which can be used to estimate a Doppler frequency. Once the Doppler frequency has been estimated, the resulting velocity can be calculated from the standard equation:

$$F=(2*V_r/\lambda)*\cos(\varphi)$$

where:
$F$=measured Doppler frequency (as obtained from the Fourier transform or other spectral analysis technique);
$V_r$=resulting velocity to be estimated;
$\lambda$=wavelength of the emitted signal; and
$\varphi$=angle between the direction of the emitted signal and the direction of movement of the water.

Since the emitted signal 68 diverges, in practice the reflected signal 70 is composed of several signals which are reflected from various locations within the area over which the emitted signal 68 is broadcast. Under normal conditions in which the returning signals are reflected from a stationary surface, the frequency of the returning signals is substantially consistent regardless of the angle of the returning signal relative to the sensor 6*a*. However, when the reflecting surface is a cross-flow 66 of water, the frequency of the returning signals varies according to the angle of the returning signal, resulting in the returning signal having an increased frequency spectrum relative to the frequency spectrum of the emitted signal 68. This is due to the fact that the frequency shift is governed by the relative speed of the emitting sensor 6*a* of the vehicle 2 and the water flow in the direction of travel of the signal 68. Therefore, the largest frequency shift occurs in the extremities of the area covered by the emitted signal 68 as it diverges. For a perpendicular cross-flow 66, the frequency spectrum of the returning signal will be symmetrical, while for a non-perpendicular cross-flow 66 the returning frequency spectrum will be asymmetrical.

By way of example, if the water flows in a direction normal to the path of the emitted signal 68, the frequency of the reflected signal 70 is substantially unaffected. It is therefore only by virtue of the divergence of the emitted signal 68 that a cross-flow 66 that is perpendicular to the vehicle 2, such as that illustrated in FIG. 3, can be detected using this method. At the other extreme, if the water flows along the same path as the signal 68, the frequency shift is maximised. For water flows at any other angle, the frequency shift is determined by a component of the flow rate in a direction parallel to the path of the signal 68. Since the angle at which the emitted signal 68 hits the water flow varies depending on the angle of the signal 68 relative to the sensor 6*a*, and as the signal is emitted in an arc or cone, the returning reflected signals 70 present at a range of frequencies. Therefore, the range of frequencies can be used in conjunction with the frequency shift to determine the presence of flowing water. Further analysis may reveal the direction of flow, and also the flow rate.

The extent of the perturbation is determined by various factors, including the speed and angle of movement of the reflecting surface, and the proportion of the reflecting surface that is moving. The scale of the perturbations may be analysed in order to determine the angle at which the surface is moving relative to the vehicle 2. The reflected signals 70 detected by each of the sensors 6*a* can be compared in order to refine calculations of the speed and angle at which the surface is moving. For example, if the cross-flow 66 is not perpendicular to the vehicle 2, one side of the vehicle 2 is closer to the water than the other. In this situation, the sensor 6*a* that is closest to the moving water receives a reflected signal 70 with stronger perturbations than the sensor 6*a* on the opposite side of the vehicle 2. Accordingly, the angle of the water flow relative to the vehicle 2 can be determined.

For the reasons outlined above, there exists a possibility of an alternative or parallel method for detecting the cross-flow 66, whereby a pair of emitted signals is emitted from a pair of sensors 6a on either side of the vehicle, and the frequency spectra and average strength of each of the returning signals is analysed. Unless the cross-flow 66 is exactly perpendicular to the central axis L of the vehicle, the distance between each of the sensors 6a and the cross-flow 66 are different to each other. This results in differing spectra in the returning signals, which is therefore indicative of the presence of the cross-flow 66.

This approach is independent of the vehicle speed, and so may be useful in circumstances in which the vehicle speed cannot be calculated with sufficient accuracy for the detection of discrepancies as described above.

In an alternative embodiment, the sensors 6a on either side of the vehicle are angled relative to the central axis L and away from one another, thereby enhancing this effect. This arrangement provides a greater difference in the returning frequency spectra owing to the difference in angle at which the emitted signals 68 are incident on the flowing water. This also enables the detection of a cross-flow at any angle relative to the vehicle: since the emitted signals are not parallel to one another, at least one of them will not be perpendicular to the cross-flow 66 no matter what angle it flows at.

The skilled reader will appreciate that although a perturbation in a reflected signal 70 may be indicative of a moving surface at ground level in the vicinity of the vehicle 2, said perturbation is not inherently indicative of moving water. However, moving water is considered to be the most likely category of moving surface at ground level near to the vehicle 2, and as such a perturbation can reasonably be assumed to be caused by moving water as opposed to any other type of movement. In this regard, it is noted that a large proportion of the surface area covered by the ultrasonic signal 68 must be moving to cause a significant perturbation in the reflected signal 70. Accordingly, small moving objects at ground level are unlikely to trigger a false determination of moving water.

As a further precaution against false detection, a threshold minimum perturbation may be implemented. This approach also assists in avoiding nuisance triggering caused by minimal water flow, such as small fords or rainwater flowing out to a drain at the side of the road. Additionally, relative cross movement of the driving surface and the sensor 6a will arise if the vehicle is traversing an arc. For this reason, a vehicle steering wheel angle is monitored so as to prevent a false cross flow detection result in this situation.

Figure 4:
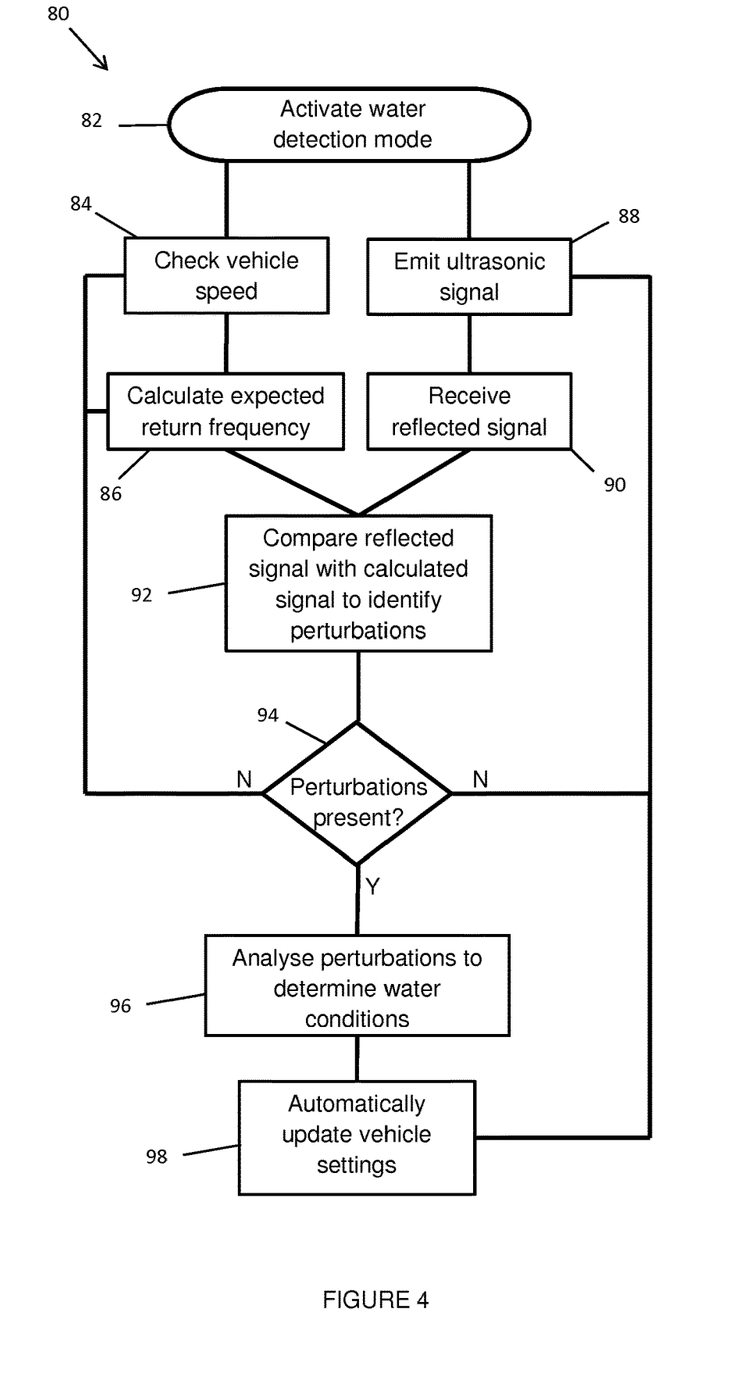
FIG. 4 is a flowchart of a process for determining the presence of flowing water in the vicinity of the vehicle of FIG. 1.

FIG. 4 illustrates a process 80 by which flowing water can be detected using the method outlined above. In this embodiment the process 80 is controlled by the flow detection processor 20, although in other embodiments the park assist module 18 is adapted to control the process 80.

As shown in FIG. 4, the process 80 initiates with the activation at Step 82 of the water detection mode. The activation may be automated, for example through configuring the system to activate at all times when the park assist function is not being used. Alternatively, the water detection mode may be activated according to the driving surface as detected by other vehicle systems, or according to a drive mode selected by the user. The user may also have the ability to activate water detection manually through the HMI 22. As a further alternative, cross-flow detection may be deactivated by default, and activated in the event that the presence of water near to the vehicle is indicated by alternative vehicle systems.

On activation of the water detection mode, two concurrent sub-processes initiate. In the first, the flow detection processor 20 checks at Step 84 the instantaneous vehicle speed, and calculates at Step 86 an expected frequency for a returning reflected signal 70. This sub-process iterates continuously, so that an instantaneous expected signal frequency is always available. In the second sub-process, an ultrasonic signal 68 is emitted at Step 88 from each of the sensors 6a, and respective reflected signals 70 are received at Step 90 at each sensor 6a.

Next, the received reflected signals 70 are compared at Step 92 with the expected return frequency, in order to identify at Step 94 perturbations in the reflected signals 70. If no perturbations are identified, the process 80 returns to Steps 84 and 88.

If perturbations are identified in the reflected signals 70, as noted above this is indicative of moving scattering objects in a surface in the area into which the ultrasonic signals 68 are broadcast, which is presumed to be flowing water. Accordingly, the perturbations are then analysed at Step 96 in order to determine the water conditions, for example flow rate and flow direction. This involves analysis of each signal individually, and also a comparison of the signals with each other.

Once the analysis is complete, the flow detection processor 20 uses the calculated water conditions to determine whether to trigger an alert to present to the driver, in dependence upon the detected speed of water. The required output can be presented via the HMI 22.

Figure 5A:
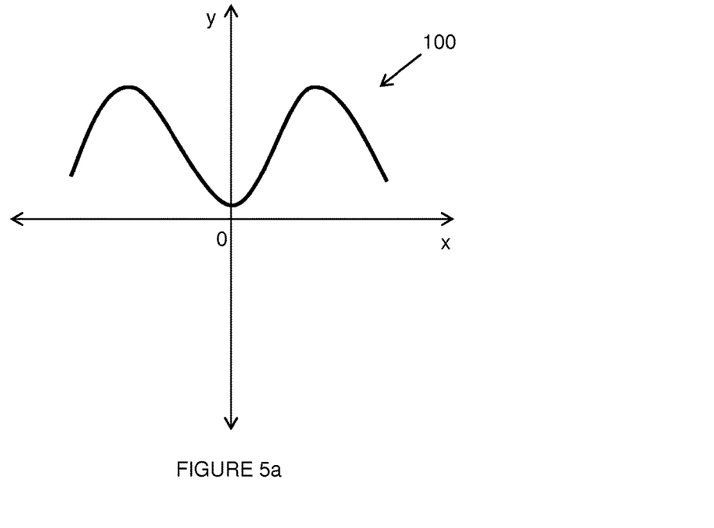
FIG. 5a is a graph illustrating a frequency spectrum for a returning signal for the case where the vehicle approaches a perpendicular cross-flow.
Figure 5B:
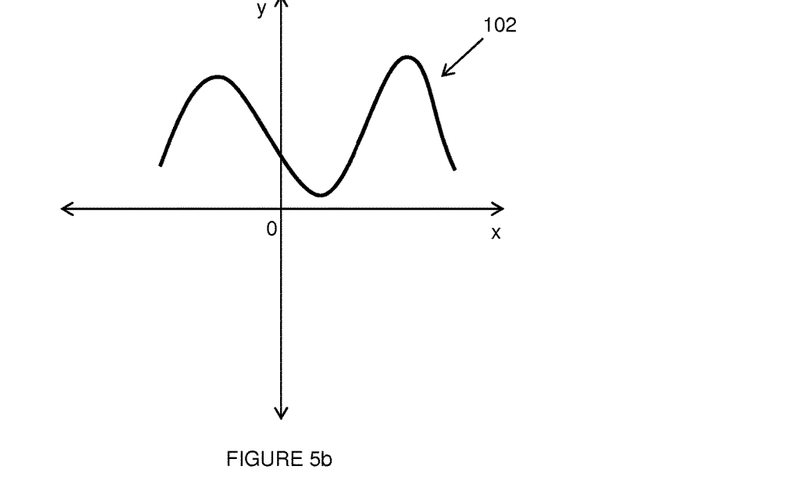
FIG. 5b is a graph illustrating a frequency spectrum for a returning signal for the case where the vehicle approaches a non-perpendicular cross-flow.

FIGS. 5a and 5b illustrate graphically how the angle at which a vehicle 2 approaches a cross-flow 66 of water influences the resulting frequency spectrum in a reflected signal. In both graphs, the x-axis represents the angle of the reflected signal relative to the vehicle 2, and the y-axis represents the magnitude of the frequency shift.

FIG. 5a shows the resulting frequency spectrum 100 for the case where the cross-flow 66 is perpendicular to the vehicle 2, as is shown in FIG. 3. As noted above, in this scenario a maximum frequency shift is induced at the extremities of the emitted signal, i.e. at the edges of the conical signal. This is because a velocity component of the water in the direction of the signal is greatest where the angle between the signal and the cross-flow 66 is furthest from 90°. A minimum shift is induced at the centre of the emitted signal, corresponding to a position directly in front of the vehicle 2. This is because at that location the water flows entirely perpendicularly to the signal, and so there is no velocity component in the direction of the signal to cause a frequency shift.

FIG. 5b shows a corresponding frequency spectrum 102 which arises in the reflected signal when the vehicle 2 approaches a cross-flow 66 which is not perpendicular to the vehicle 2. As above, the minimum point in the frequency spectrum 102 corresponds to a location where a portion of the emitted signal is incident on the cross-flow 66 such that water flows at 90° to the signal. This does not occur directly ahead of the vehicle 2; rather, a portion of the signal to one side of the vehicle 2 is perpendicular to the cross-flow 66. Therefore, the minimum frequency shift appears away from the centre of the graph, with the effect that the entire spectrum 102 is shifted in the x-axis.

It is noted that in the graph shown in FIG. 5b, the peak of the signal to the right of the y-axis is higher than the peak to the left of the y-axis. This is illustrative of the fact that the returning signal is not simply shifted in the x-axis compared with the FIG. 5a example, but is also stretched or compressed according to the angle of approach and the flow characteristics of the water.

In the description above, the flow detection processor 20, the park assist module 18 and the adaptive cruise control module 16 have been described as distinct functional modules. As such, they should be considered to represent separate processing functions provided by suitable electronic equipment in the vehicle 2. However, it will be appreciated that the functions may not be provided by physically separate processing entities and may instead be provided by an integrated processing entity such as a vehicle Body Control Module (BCM) as is generally known in the art.

Although in the system described above determination of water flow is achieved using the ultrasonic sensors that are provided on the vehicle 2 for other purposes (namely for the park assist function), it is also possible to equip the vehicle 2 with sensors that are dedicated to the water flow detection function, and so are optimised for this purpose. Alternatively, the radar sensor 8 and the adaptive cruise control module 16 could be utilised in the place of the acoustic sensors 6 and the park assist module 18. Such a system operates on the same principles as the embodiment described above. Furthermore, water detection as described above could be enabled for any sensor system capable of emitting a suitable periodic signal, for example an acoustic or an electromagnetic waveform.

It will be appreciated by a person skilled in the art that the invention could be modified to take many alternative forms to that described herein, without departing from the scope of the appended claims.

Further aspects of the present invention are set out in the following numbered paragraphs:

1. A method for determining the presence of flowing water in the vicinity of a vehicle, the method comprising:
    emitting a pair of periodic signals into an area surrounding the vehicle;
    receiving a pair of reflected periodic signals each of which is a reflection of at least part of a respective one of the emitted pair of periodic signals;
    comparing the reflected pair of periodic signals to identify differences between them; and
    analysing the differences to determine the presence of flowing water in the area surrounding the vehicle.
2. A method for determining the presence of flowing water in the vicinity of a vehicle, the method comprising:
    emitting a periodic signal into an area surrounding the vehicle;
    receiving a signal that is a reflection of at least part of the emitted periodic signal;
    identifying perturbations in the reflected periodic signal; and
    analysing the perturbations to determine the presence of flowing water in the area surrounding the vehicle.
3. A method according to paragraph 1 or paragraph 2, wherein the or each emitted periodic signal is acoustic.
4. A method according to paragraph 3, wherein the or each emitted periodic signal has a frequency in the range 40 kHz to 55 kHz.
5. A method according to paragraph 3 or paragraph 4, wherein the or each emitted periodic signal is emitted by an acoustic sensor associated with a vehicle-mounted assisted parking system.
6. A method according to paragraph 1 or paragraph 2, wherein the or each emitted periodic signal is electromagnetic.
7. A method according to paragraph 6, wherein the or each emitted periodic signal is emitted from a radar sensor associated with a vehicle-mounted adaptive cruise control system.
8. A method according to paragraph 2, comprising determining an expected reflected periodic signal, and comparing the reflected periodic signal with the expected reflected periodic signal to identify the perturbations.
9. A method according to paragraph 8, wherein perturbations falling below a pre-determined threshold are not analysed.
10. A method according to paragraph 8, wherein the expected reflected periodic signal is calculated based on the speed of the vehicle.
11. A method according to paragraph 8, wherein the perturbations manifest in the reflected periodic signal as a frequency difference compared with the expected reflected waveform.
12. A method according to paragraph 1, wherein the differences between the reflected signals comprise differing frequency spectra.
13. A method according to paragraph 1, wherein the differences between the reflected signals comprise differing average signal strengths.
14. A method according to paragraph 1 or paragraph 2, wherein a water flow direction is determined.
15. A method according to paragraph 1 or paragraph 2, wherein a water flow rate is determined.
16. A method according to paragraph 1 or paragraph 2, comprising activating a vehicle wading mode upon detection of moving water.
17. A method according to paragraph 1 or paragraph 2, wherein a water detection mode is activated automatically according to driving parameters.
18. A method according to paragraph 1 or paragraph 2, wherein a water detection mode is user-activated through a human-machine interface of the vehicle.
19. A method according to paragraph 1 or paragraph 2, comprising triggering an alert upon detection of moving water.
20. A method according to paragraph 19, comprising presenting the alert to a driver of the vehicle.
21. A system for determining the presence of flowing water in the vicinity of a vehicle, the system comprising:
    at least one transmitter arranged to emit a pair of periodic signals into an area surrounding the vehicle;
    at least one sensor arranged to receive a pair of reflected periodic signals each of which is a reflection of at least part of a respective one of the emitted pair of periodic signals; and
    a processor arranged to compare the reflected periodic signals to identify differences between them, and to analyse the differences to determine the presence of flowing water in the area surrounding the vehicle.
22. A system for determining the presence of flowing water in the vicinity of a vehicle, the system comprising:
    at least one transmitter arranged to emit a periodic signal into an area surrounding the vehicle;
    at least one sensor arranged to receive a periodic signal that is a reflection of at least part of the emitted periodic signal; and
    a processor arranged to identify perturbations in the reflected periodic signal and to analyse the perturbations to determine the presence of flowing water in the area surrounding the vehicle.
23. A system according to paragraph 21 or paragraph 22, wherein the or each transmitter is an acoustic transmitter.

24. A system according to paragraph 21 or paragraph 22, wherein the or each acoustic transmitter is associated with a vehicle-mounted assisted parking system.

25. A system according to paragraph 21 or paragraph 22, wherein the periodic signal is electromagnetic.

26. A system according to paragraph 25, wherein the or each transmitter is a radar sensor associated with a vehicle-mounted adaptive cruise control system.

27. A system according to paragraph 21 or paragraph 22, wherein the or each sensor and the or each transmitter are integrated.

28. A system according to paragraph 22, wherein the processor is arranged to determine an expected reflected periodic signal, and to compare the reflected periodic signal with the expected reflected periodic signal to identify the perturbations.

29. A system according to paragraph 28, wherein the processor is arranged only to analyse perturbations exceeding a pre-determined threshold.

30. A system according to paragraph 28, wherein the processor is arranged to calculate the expected reflected periodic signal based on the speed of the vehicle.

31. A system according to paragraph 28, wherein the perturbations manifest in the reflected periodic signal as a frequency difference compared with the expected reflected periodic signal.

32. A system according to paragraph 21, wherein the differences comprise differing frequency spectra.

33. A system according to paragraph 21, wherein the differences comprise differing average signal strengths.

34. A system according to paragraph 21 or paragraph 22, wherein the system is arranged to trigger an alert on detection of moving water.

35. A computer program product executable on a processor so as to implement a method for determining the presence of flowing water in the vicinity of a vehicle, the method comprising: emitting a pair of periodic signals into an area surrounding the vehicle; receiving a pair of reflected periodic signals each of which is a reflection of at least part of a respective one of the emitted pair of periodic signals; comparing the reflected pair of periodic signals to identify differences between them; and analysing the differences to determine the presence of flowing water in the area surrounding the vehicle.

36. A computer program product executable on a processor so as to implement a method for determining the presence of flowing water in the vicinity of a vehicle, the method comprising: emitting a periodic signal into an area surrounding the vehicle; receiving a signal that is a reflection of at least part of the emitted periodic signal; identifying perturbations in the reflected periodic signal; and analysing the perturbations to determine the presence of flowing water in the area surrounding the vehicle.

37. A computer readable medium loaded with the computer program product of paragraph 35 or paragraph 36.

38. A processor arranged to implement the method of paragraph 1 or paragraph 2, or the computer program product of paragraph 35 or paragraph 36.

39. A vehicle comprising a system for determining the presence of flowing water in the vicinity of a vehicle, the system comprising: at least one transmitter arranged to emit a pair of periodic signals into an area surrounding the vehicle; at least one sensor arranged to receive a pair of reflected periodic signals each of which is a reflection of at least part of a respective one of the emitted pair of periodic signals; and a processor arranged to compare the reflected periodic signals to identify differences between them, and to analyse the differences to determine the presence of flowing water in the area surrounding the vehicle.

40. A vehicle comprising a system for determining the presence of flowing water in the vicinity of a vehicle, the system comprising: at least one transmitter arranged to emit a periodic signal into an area surrounding the vehicle; at least one sensor arranged to receive a periodic signal that is a reflection of at least part of the emitted periodic signal; and a processor arranged to identify perturbations in the reflected periodic signal and to analyse the perturbations to determine the presence of flowing water in the area surrounding the vehicle.

The invention claimed is:

1. A method for determining the presence of flowing water in the vicinity of a vehicle, the method comprising:
   emitting, from the vehicle, a pair of periodic signals into an area surrounding the vehicle;
   receiving, at the vehicle, a pair of reflected periodic signals each of which is a reflection of at least part of a respective one of the emitted pair of periodic signals;
   comparing the reflected pair of periodic signals to identify differences between them;
   analysing the differences to determine the presence of flowing water in the area surrounding the vehicle; and
   upon detection of moving water, activating a vehicle wading mode and/or presenting an alert to the driver of the vehicle.

2. A method for determining the presence of flowing water in the vicinity of a vehicle, the method comprising:
   emitting, from the vehicle, a periodic signal into an area surrounding the vehicle;
   receiving, at the vehicle, a signal that is a reflection of at least part of the emitted periodic signal;
   identifying perturbations in the reflected periodic signal; and
   analysing the perturbations to determine the presence of flowing water in the area surrounding the vehicle; and
   upon detection of moving water, activating a vehicle wading mode and/or presenting an alert to the driver of the vehicle.

3. A method according to claim 1, wherein the or each emitted periodic signal is one of:
   an acoustic signal
   emitted by an acoustic sensor associated with a vehicle-mounted assisted parking system, and an
   electromagnetic signal emitted from a radar sensor associated with a vehicle-mounted adaptive cruise control system.

4. A method according to claim 3, comprising determining an expected reflected periodic signal, and comparing the reflected periodic signal with the expected reflected periodic signal to identify the perturbations, optionally
   wherein perturbations falling below a pre-determined threshold are not analysed and/or,
   wherein the expected reflected periodic signal is calculated based on the speed of the vehicle and/or,
   wherein the perturbations manifest in the reflected periodic signal as a frequency difference compared with the expected reflected waveform.

5. A method according to claim 3, wherein the differences between the reflected signals comprise one or more of differing average signal strengths and differing frequency spectra.

6. A method according to claim 1, wherein one or more of a water flow direction and water flow rate are determined.

7. A system for determining the presence of flowing water in the vicinity of a vehicle, the system comprising:
- a transmitter disposed on the vehicle and arranged to emit a pair of periodic signals into an area surrounding the vehicle;
- a sensor disposed on the vehicle and arranged to receive a pair of reflected periodic signals each of which is a reflection of at least part of a respective one of the emitted pair of periodic signals; and
- a processor arranged to compare the reflected periodic signals to identify differences between them, and to analyse the differences to determine the presence of flowing water in the area surrounding the vehicle;
- wherein upon detection of moving water, the system activates a vehicle wading mode and/or presents an alert to the driver of the vehicle.

8. A system for determining the presence of flowing water in the vicinity of a vehicle, the system comprising:
- a transmitter disposed on the vehicle and arranged to emit a periodic signal into an area surrounding the vehicle;
- a sensor disposed on the vehicle and arranged to receive a periodic signal that is a reflection of at least part of the emitted periodic signal; and
- a processor arranged to identify perturbations in the reflected periodic signal and to analyse the perturbations to determine the presence of flowing water in the area surrounding the vehicle;
- wherein upon detection of moving water, the system activates a vehicle wading mode and/or presents an alert to the driver of the vehicle.

9. A system according to claim 7, wherein the transmitter is an acoustic transmitter and/or,
- wherein the acoustic transmitter is associated with a vehicle-mounted assisted parking system and/or,
- wherein the transmitter is a radar sensor associated with a vehicle-mounted adaptive cruise control system.

10. A system according to claim 9 wherein the processor is arranged to determine an expected reflected periodic signal, and to compare the reflected periodic signal with the expected reflected periodic signal to identify the perturbations and/or,
- wherein the processor is arranged to calculate the expected reflected periodic signal based on the speed of the vehicle and/or,
- wherein the perturbations manifest in the reflected periodic signal as a frequency difference compared with the expected reflected periodic signal.

11. A non-transient computer readable medium loaded with the computer program executable on a processor so as to implement the method of claim 1.

12. A processor arranged to implement the method of claim 1.

13. A vehicle comprising the water detection system of claim 7.

14. A method according to claim 2, wherein one or more of a water flow direction and water flow rate are determined.

15. A system according to claim 8, wherein the transmitter is an acoustic transmitter and/or wherein the acoustic transmitter is associated with a vehicle-mounted assisted parking system and/or wherein the transmitter is a radar sensor associated with a vehicle-mounted adaptive cruise control system.

16. A system according to claim 15, wherein the processor is arranged to determine an expected reflected periodic signal, and to compare the reflected periodic signal with the expected reflected periodic signal to identify the perturbations and/or wherein the processor is arranged to calculate the expected reflected periodic signal based on the speed of the vehicle and/or wherein the perturbations manifest in the reflected periodic signal as a frequency difference compared with the expected reflected periodic signal.

* * * * *